C. F. BURKHART.
SHOE DRESSING DELIVERING MECHANISM.
APPLICATION FILED JAN. 24, 1911. RENEWED DEC. 22, 1915.
1,181,835.
Patented May 2, 1916.
5 SHEETS—SHEET 2.
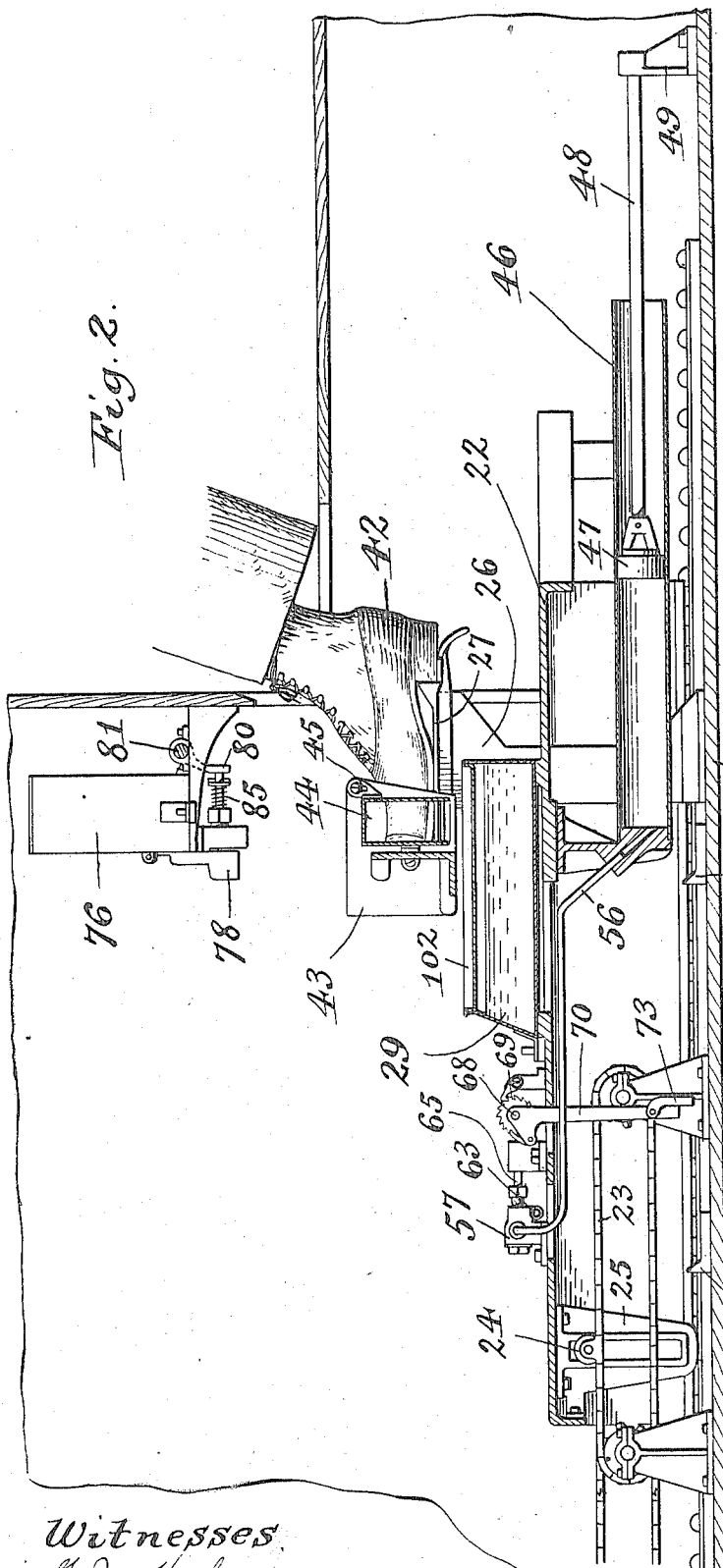
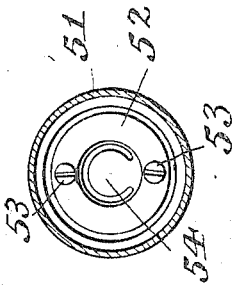

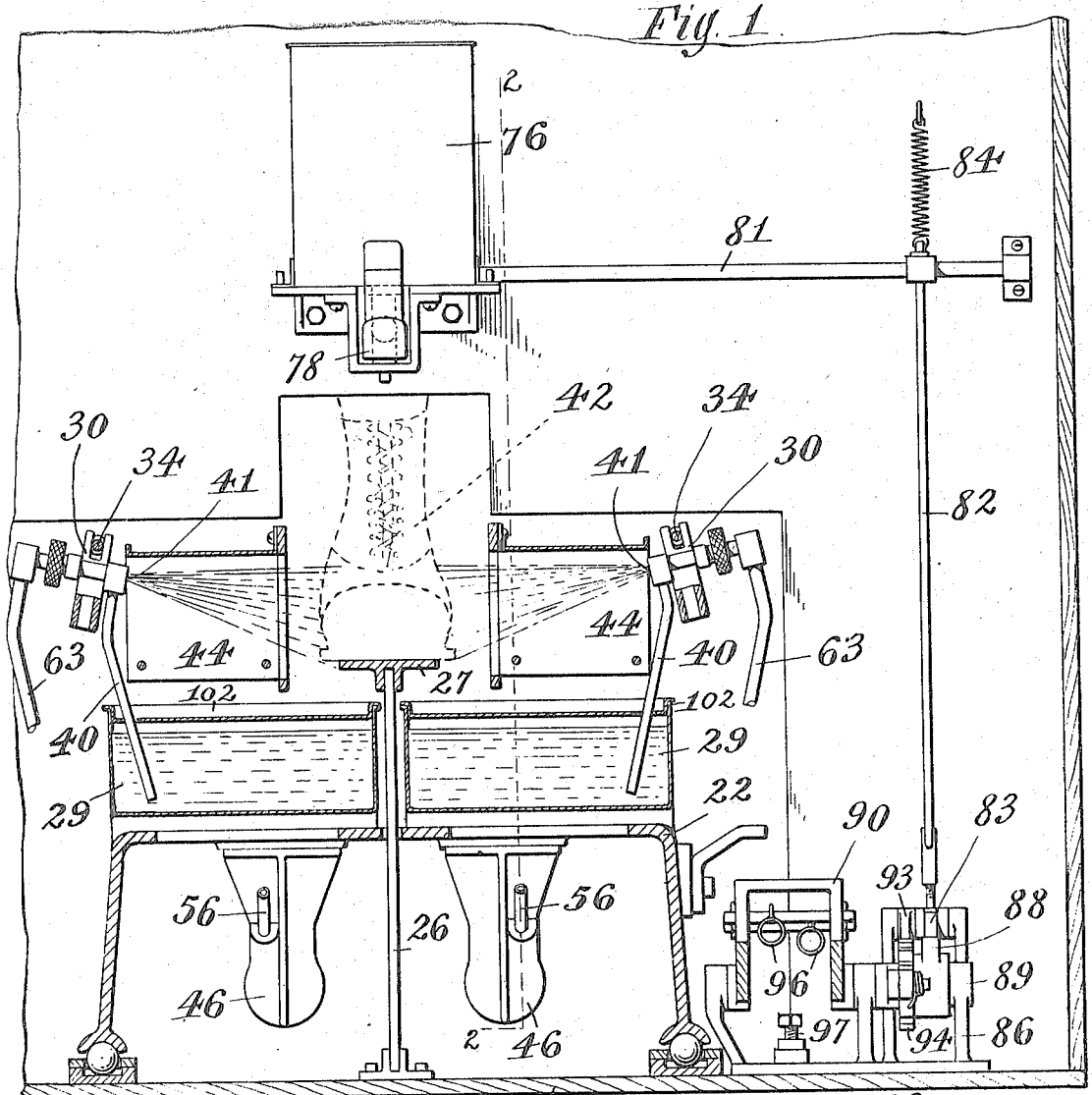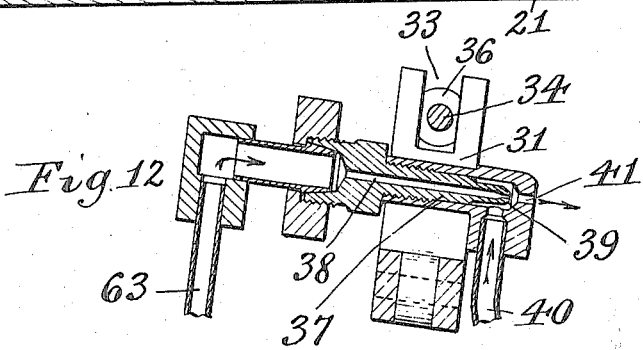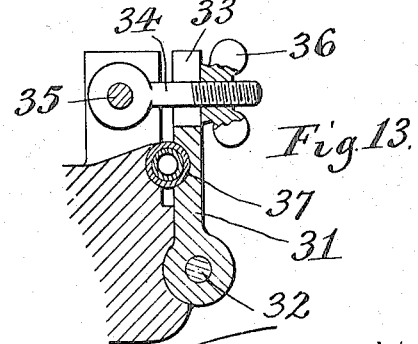

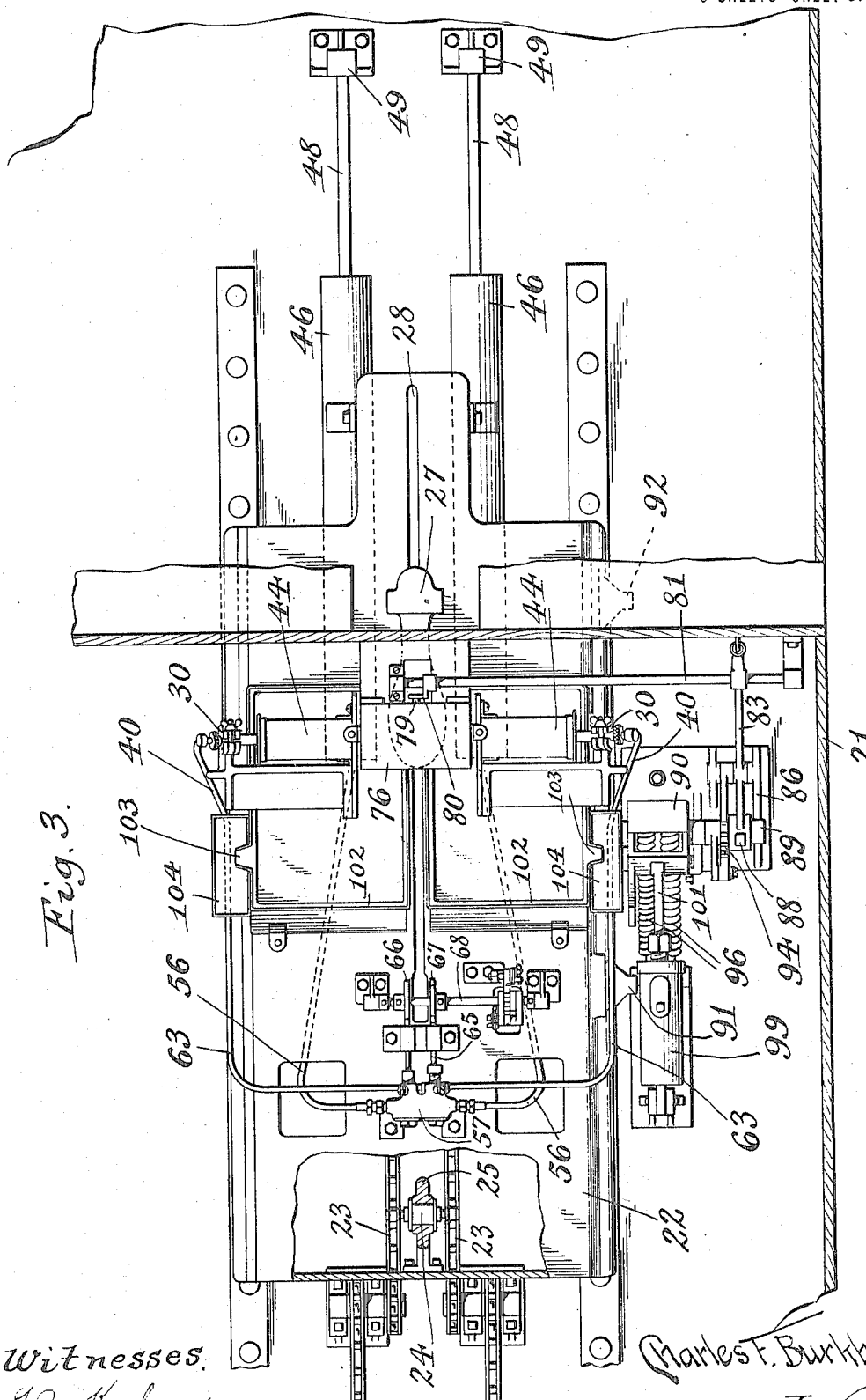

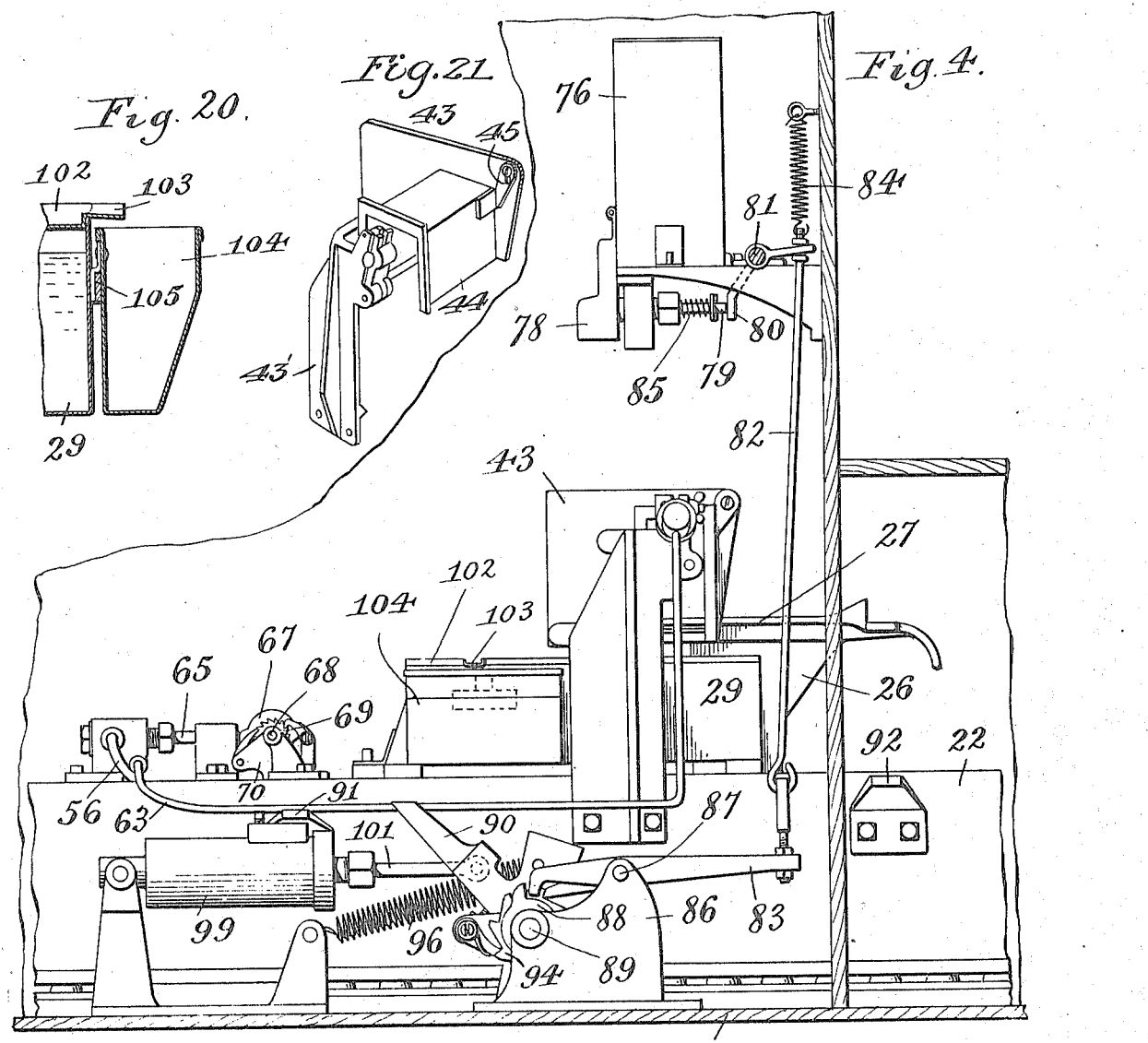
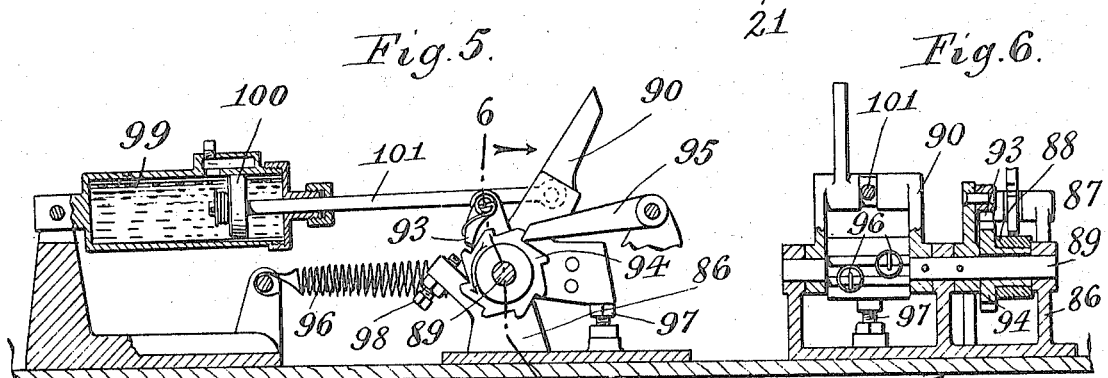
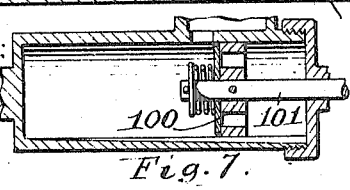

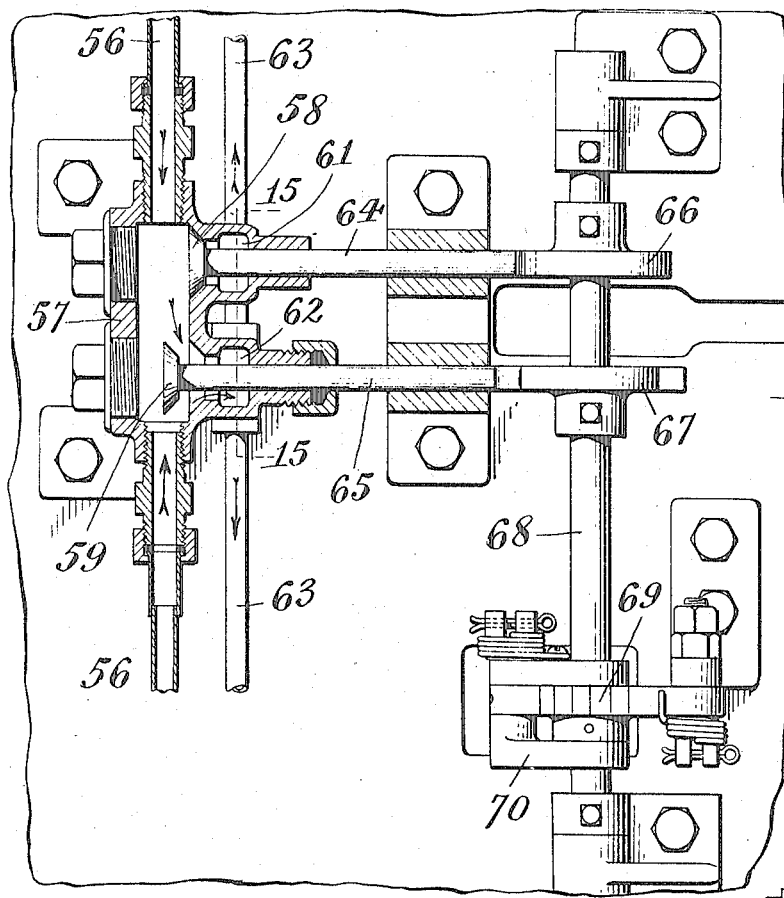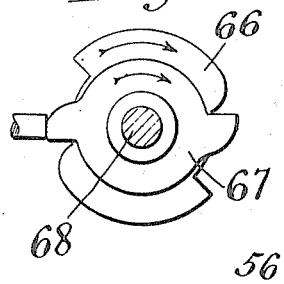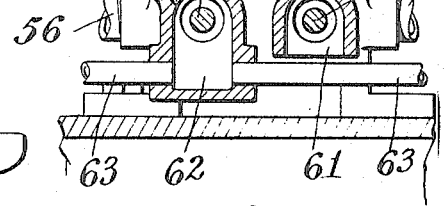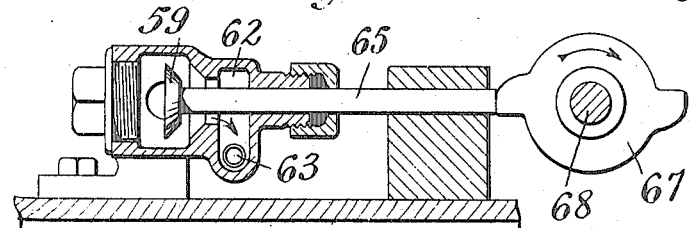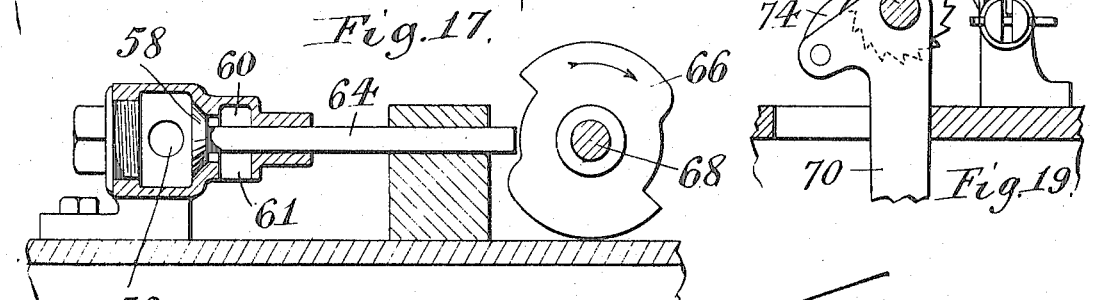

UNITED STATES PATENT OFFICE.

CHARLES F. BURKHART, OF BUFFALO, NEW YORK, ASSIGNOR TO BURKHART CORPORATION, OF BUFFALO, NEW YORK, A CORPORATION OF NEW YORK.

SHOE-DRESSING-DELIVERING MECHANISM.

1,181,835.  Specification of Letters Patent.  Patented May 2, 1916.

Application filed January 24, 1911, Serial No. 604,409. Renewed December 22, 1915. Serial No. 68,296.

*To all whom it may concern:*

Be it known that I, CHARLES F. BURKHART, a citizen of the United States, residing at Buffalo, in the county of Erie and State of New York, have invented certain new and useful Improvements in Shoe-Dressing-Delivering Mechanism; and I do hereby declare the following to be a full, clear, and exact description of the invention, such as will enable others skilled in the art to which it appertains to make and use the same.

This invention relates to dressing delivering mechanism for shoe dressing and polishing machines and has for an object to provide means for carrying and delivering liquid dressing to a shoe positioned upon a shoe rest adjacent to the dressing carrying receptacles.

A further object of the invention is to provide improved means for supplying air under pressure for serving as an atomizer for delivering such liquid dressing.

A further object of the invention is to provide means for simultaneously spraying or atomizing liquid dressing upon the sides of a shoe and delivering liquid dressing from another source upon the top of the shoe.

With these and other objects in view the invention comprises certain novel constructions, combinations and arrangement of parts as will be hereinafter more fully described and claimed.

In the drawings: Figure 1 is a view in transverse section of the improved delivering means taken through the dressing receptacles and atomizers. Fig. 2 is a longitudinal sectional view of the mechanism taken through one of the dressing receptacles as indicated by line 2—2 of Fig. 1. Fig. 3 is a top plan view of the mechanism with parts broken away to disclose underlying parts. Fig. 4 is a longitudinal enlarged side view of the delivering mechanism. Fig. 5 is a longitudinal sectional view of the timing shaft and dash-pot. Fig. 6 is a vertical transverse sectional view through the timing shaft and operating mechanism as indicated by line 6—6 of Fig. 5. Fig. 7 is an enlarged detail sectional view of the dash-pot. Fig. 8 is a view in side elevation of a cam adapted to actuate the mechanism for supplying dressing to the top of the shoe. Fig. 9 is a view of a fragment of the air compressor shown in longitudinal section. Fig. 10 is a transverse sectional view of the air compressor taken on line 10—10 of Fig. 9. Fig. 11 is a vertical sectional detail view of the mechanism for discharging dressing upon the top of the shoe. Fig. 12 is a detail sectional view of one of the atomizers for supplying dressing to the sides of the shoe. Fig. 13 is a detail sectional view of the atomizer holding device. Fig. 14 is a top plan view partly in section of the valves controlling admission of air to the atomizers. Fig. 15 is a transverse sectional view through the valves on line 15—15 of Fig. 14. Fig. 16 is a longitudinal sectional view through the valve which controls the flow of air to the atomizers, showing the valve open. Fig. 17 is a longitudinal sectional view through the relief or exhaust valve showing such valve closed. Fig. 18 is a detail view in side elevation of the cams and their carrying shafts which operate the air valves. Fig. 19 is a view in side elevation of the ratchet mechanism controlling the air valves. Fig. 20 is a detail view of a fragment of the dressing receptacle drip pan and drip cup. Fig. 21 is a perspective view of the atomizer holding device and one of the hoods.

Like characters of reference designate corresponding parts throughout the several views.

The mechanism which forms the subject matter of this application is similar in the general plan to that disclosed in co-pending applications, Serial Nos. 335,310, filed Sept. 19th, 1906; 365,294, filed March 29th, 1907, and 428,187, filed April 20th, 1908, and comprises a base or frame 21 having a carriage 22 mounted to reciprocate thereon and driven in any approved manner as by the sprocket chains 23, roller 24 and bracket 25, substantially as disclosed in said co-pending application No. 428,187.

Mounted rigidly upon the frame is a bracket 26 carrying a shoe support or rest 27, the said carriage being provided with a slot 28 to accommodate such bracket and position the shoe support above the deck of such carriage. Mounted upon the carriage upon opposite sides of the slot 28 are dressing reservoirs 29 of such height as to be disposed just beneath the shoe support 27. Carried also upon the carriage are clamps indicated as a whole at 30 comprising a member 31 pivoted as at 32 and bifurcated as at 33 at the end opposite the pivot. An eye-bolt 34 is pivoted as at 35 and provided with a winged nut 36 adapted to hold such member 31 in clamping position to clamp the atomizer tube 37. The atomizer tube 37 comprises an air delivery nozzle 38 and a dressing delivery chamber 39 to the latter of which is connected a tube 40 extending and submerged in the reservoir 29. The sprayer nozzle 41 is so directed as to deliver atomized dressing to the shoe 42 resting upon the shoe rest 27. To properly direct such atomized stream to engage only the sides of the shoe, guards 43 are supported upon brackets 43' to position the sides of the shoe, with hoods 44 opening outwardly upon opposite sides thereof, such hoods being vertically adjustable by means of slots 45 whereby the hoods can be so adjusted that the atomized stream will impinge upon the shoe only to the height desired.

To supply motive fluid for the atomizers cylinders 46 are rigidly mounted upon the carriage while pistons 47 are mounted to slide in such cylinders and carried upon piston rods 48 rigidly connected with the base by means of brackets 49 so that as the carriage reciprocates the piston 47 is given the effect of reciprocating in the cylinder 46. The piston 47 comprises a head 50 to which an elastic gasket 51 is secured by means of a ring 52 and screws 53 the said elastic gasket being provided with a central flap 54 while the piston head 50 is provided with a registering opening 55 so that upon the return stroke of the piston air enters through the opening 55 and moves the flap 54 to permit the free access of air to the cylinder. From the cylinder the air is conducted through a pipe 56 to the valve housing shown as a whole at 57. The valve housing 57 accommodates two valves 58 and 59 the former of which communicates with a chamber 60 opening through a passage 61 to the atmosphere so that when such valve 59 is open as shown at Fig. 14 the air from the cylinders passing through the pipes 56 is permitted to escape freely. When the valve 58 is closed as shown at Fig. 17 and the valve 59 open as shown at Fig. 16 the air from the valve housing 57 passes into the chamber 62 and thence into the pipes 63 and so to the air nozzle 38 of the atomizers.

To actuate the valves 58 and 59 such valves are respectively mounted upon valve stems 64 and 65 which extend into contact respectively with cams 66 and 67 carried upon shaft 68. The formation of the cams 66 and 67 is such that the cam 66 holds the valve 58 open during three reciprocations of the carriage 22 while the cam 67 permits the valve 59 to remain closed during such time but opens such valve during one reciprocation of the carriage.

To rotate the shaft 68 in timed relation with the reciprocations of the carriage 22 a ratchet wheel 69 is mounted rigidly upon the shaft 68 to which is pivoted a lever 70 extending downwardly through the deck of the carriage into position to be struck by abutments 71 and 72 mounted rigidly upon the base 21. The lever 70 is also provided with a pivoted extremity 73 which enables such lever to pass in one direction over the abutments 71 and 72 without actuating the lever 70 but to actuate such lever when moved in the opposite direction. The lever 70 carries a detent 74 for engaging the ratchet 69 when the lever is moved by engaging the abutments 71 and 72 and with a detent 75 to prevent backward motion of such ratchet. The result is that as the carriage moves the extremity 73 engages one of the abutments 71 which rotates the shaft 68 sufficiently to at times actuate the valves 58 and 59 to for instance open the valve 59 to permit the passage of air to the atomizer and when the extremity engages the abutment 72 it rotates said shaft sufficiently to again close such valve. The next reciprocation of the carriage will tend to open the valve 58 which is held open during three successive reciprocations of the carriage.

Above the foot-rest 27 a receptacle 76 is mounted which is supplied with dressing and also with a valve 77 adapted when open to discharge a limited quantity of dressing through the chute 78 upon the shoe 42 resting upon the foot-rest 27. To actuate the valve 77 the said valve is provided with a stem 79 which engages one arm 80 of a lever carried upon a rock shaft 81 which in turn is controlled by a rod 82 extending downwardly and having a pivotal connection with a lever 83. To provide return of the lever 80 and permit the closing of the valve a spring 84 is provided to lift the rod 82 and a spring 85 provided to close the valve 77. The lever 83 is fulcrumed upon a bracket 86 as by the pivot 87 and is actuated by means of a cam 88 carried upon a shaft 89. The shaft 89 is rotated with a step by step movement by means of a lever 90 loosely mounted upon said shaft 89 and in the path of movement of abutments 91 and 92 carried upon the carriage 22. As the carriage 22 therefore reciprocates the lever 90 is given an oscillating motion and by means of a pawl 93 engages a ratchet 94 rigidly mounted upon said shaft 89. A detent 95 is also provided to prevent return movement of the ratchet.

To prevent the lever 90 from stopping upon a dead center and thereby possibly leaving open the valve 77, springs 96 are connected with such lever in such manner as to move said lever in either direction beyond the center and also to quickly and promptly close or open the valve as may be required.

To limit and adjust the amplitudes of movement of the lever 90 stop screws 97 and 98 are employed which are engaged by said lever in its movement.

To prevent jarring and noise by the lever 90 engaging the stop screws 97 and 98 a dash-pot 99 is employed having a piston 100 slidably mounted therein and connected by means of a piston rod 101 with the lever 90.

The tops of the dressing receptacles 29 are provided with upstanding flanges 102 providing pans upon the top of such receptacles positioned to receive excess dressing delivered by any of the delivering means and such flanges are bent downwardly to form lips 103 with drip pans 104 positioned to receive the drip from such lips. The drip pans 104 are removably connected with the dressing reservoirs 29 by means of slip joints 105 as shown particularly at Fig. 20.

In operation the carriage 22 is reciprocated by the application of any approved power to the sprocket chains 23 which reciprocation moves the levers 70 and 90 synchronously therewith. The movement of the levers 70 and 90 respectively rotate the shafts 68 and 89 with a step by step movement, the former to control the valves 58 and 59 as before described and the latter to control the valve 77. The result is that at the proper times air is admitted by the valve 59 to the atomizers to spray dressing upon the sides of the shoe and also at the proper time the valve 77 is opened to discharge dressing upon the top of the shoe by gravity. It has been found highly desirable to employ the latter means of discharging dressing for the reason that atomizing or spraying the dressing upon the sides of the shoe cannot be accomplished satisfactorily to cover the top of the shoe without spraying such dressing so high as to be objectionable in the case of low shoes or in spraying above the vamp of a high shoe. At times other than that during which air is being supplied to the atomizers the valve 58 is open so that air compressed within the cylinders 46 escapes freely through such valve 58 without offering material resistance.

The wings or shields 44 by reason of the adjustment permitted by the slots 45 enables the operator to so control the device as to deliver the dressing only upon that part of the shoe requiring such treatment.

In case the air pressure becomes excessive or when it is desired to vary the pressure of the air as delivered to the atomizers the screw 106 is employed which is provided with a longitudinally tapered groove so that by unscrewing such screw a greater orifice is provided for the escape of excess air pressure. By employing this screw 106 any desired air pressure may be delivered to the atomizers.

I claim:—

1. In a shoe dressing mechanism, a shoe rest, a carriage mounted to reciprocate, atomizers carried by the carriage adapted to deliver dressing along the opposite sides of the shoe rest, an air compressor controlled by the reciprocations of the carriage, a conduit communicating from such air compressing means to the atomizers, valve means interposed in the conduit, and means controlled by the reciprocations of the carriage for at times controlling the valve means to deliver air to the atomizers and at other times to permit its escape to the atmosphere.

2. In a shoe dressing mechanism, a shoe rest, a reciprocating carriage, atomizers positioned to deliver dressing along the opposite sides of the shoe rest, air compressing mechanism actuated by the reciprocations of the carriage, a valve housing, conduits from the air compressing mechanism to the valve housing, conduits leading from the valve housing to the atomizers, valves mounted in the housing one adapted to permit the escape of compressed air from the housing to the atmosphere and the other adapted to open communication between the two conduits and means to actuate the valves alternately in timed relation to the reciprocations of the carriage.

3. In a shoe dressing mechanism, a shoe rest, a carriage mounted to reciprocate adjacent the shoe rest, atomizers carried by the carriage adapted to deliver dressing upon opposite sides of the shoe rest, air compressing mechanism controlled by the reciprocations of the carriage, a valve housing mounted upon the carriage, conduits leading from the air compressing mechanism to the valve housing, other conduits leading from the valve housing to the atomizers, reciprocating valves one adapted to permit the escape of compressed air from the housing to the atmosphere and the other adapted to permit the flow of air from the housing to the atomizers, a shaft journaled adjacent the valve housing, cams carried by the shaft adapted to actuate the valves to alternately open and close the same, and means carried by the carriage for advancing the shaft with a step by step movement.

4. In a shoe dressing mechanism, a shoe rest, a carriage mounted to reciprocate adjacent the shoe rest, atomizers carried by the carriage adapted to deliver dressing along the opposite sides of the shoe rest, air compressing mechanism actuated by the reciprocations of the carriage, a valve housing carried by the carriage, conduits leading from the air compressing mechanism to the valve housing, tubes leading from the valve housing to the atomizers, valves mounted in the housing one adapted to open communication from the housing to the atmosphere and the other to open communication between the conduits and the pipe, a shaft journaled adjacent the valve housing, cams carried by the shaft adapted to alternately open and close the valves, a lever fulcrumed upon the shaft and extending into the path of movement of the carriage, and a ratchet connecting the lever and shaft whereby the oscillating of the lever advances the shaft with a step by step movement.

In testimony whereof I affix my signature in presence of two witnesses.

CHARLES F. BURKHART.

Witnesses:
 ROBT. T. LANG,
 L. L. MORRILL.